(12) United States Patent  (10) Patent No.: US 8,704,401 B2
Kato et al.  (45) Date of Patent: Apr. 22, 2014

(54) VEHICLE ELECTRIC POWER SUPPLY SYSTEM

(75) Inventors: Takeshi Kato, Wako (JP); Hiroyoshi Suzuki, Wako (JP); Takamichi Shimada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 13/038,586

(22) Filed: Mar. 2, 2011

(65) Prior Publication Data

US 2011/0233996 A1 Sep. 29, 2011

(30) Foreign Application Priority Data

Mar. 3, 2010 (JP) ................................. 2010-047060
Mar. 3, 2010 (JP) ................................. 2010-047061

(51) Int. Cl.
*B60L 1/00* (2006.01)
(52) U.S. Cl.
USPC ........................................................ 307/9.1
(58) Field of Classification Search
USPC .......................................... 307/10.1, 9.1, 82
See application file for complete search history.

(56) References Cited

U.S. PATENT DOCUMENTS

| | | | |
|---|---|---|---|
| 7,649,335 B2 * | 1/2010 | Ishikawa et al. | 320/104 |
| 8,159,850 B2 * | 4/2012 | Manabe et al. | 363/149 |
| 2004/0106025 A1 * | 6/2004 | Saito et al. | 429/23 |
| 2009/0014221 A1 * | 1/2009 | Kim et al. | 180/65.1 |
| 2010/0207587 A1 * | 8/2010 | Oyobe et al. | 320/152 |
| 2011/0307136 A1 * | 12/2011 | Komata et al. | 701/22 |

FOREIGN PATENT DOCUMENTS

| | | |
|---|---|---|
| JP | 6-199139 A | 7/1994 |
| JP | 6-231807 A | 8/1994 |
| JP | 7-073908 A | 3/1995 |
| JP | 8-138762 A | 5/1996 |
| JP | 2001-113960 A | 4/2001 |
| JP | 2001-167778 A | 6/2001 |
| JP | 2005-057928 A | 3/2005 |
| JP | 2006-025595 A | 1/2006 |
| JP | 2006-321389 A | 11/2006 |
| JP | 2006-345606 | 12/2006 |
| JP | 2007-39020 | 2/2007 |
| JP | 2007-202244 A | 8/2007 |

(Continued)

OTHER PUBLICATIONS

Japanese Office Action dated Nov. 20, 2013, for corresponding Japanese Application No. 2010-047060.

(Continued)

*Primary Examiner* — Jared Fureman
*Assistant Examiner* — Duc M Pham
(74) *Attorney, Agent, or Firm* — Squire Sanders (US) LLP

(57) ABSTRACT

A vehicle electric power supply system includes: an electric power generating source; a battery; a first voltage converter configured to raise a voltage of the electric power generating source; a second voltage converter configured to raise a voltage of the battery; and an electric power converter configured to supply voltages, which are obtained by conversions by the respective first and second voltage converters, to a vehicle load. A power control unit, which includes the first voltage converter, the second voltage converter and the electric power converter, and the battery are integrated into a unitary component, and are placed in a front portion of a vehicle while isolated from a vehicle interior. Accordingly, it is possible to widen the vehicle interior and a luggage containing space in the vehicle's rear portion, and to avoid increase in the weight of the vehicle.

7 Claims, 6 Drawing Sheets

(56) References Cited

FOREIGN PATENT DOCUMENTS

| | | |
|---|---|---|
| JP | 2008-189249 A | 8/2008 |
| JP | 2008-193864 | 8/2008 |
| JP | 2009-126256 A | 6/2009 |
| JP | 2009-291008 A | 12/2009 |

OTHER PUBLICATIONS

Japanese Office Action dated Dec. 18, 2013, for corresponding Japanese Application No. 2010-047061.

* cited by examiner

VEHICLE ELECTRIC POWER SUPPLY SYSTEM

BACKGROUND OF THE INVENTION

1. Field of the Invention

The present invention relates to a vehicle electric power supply system comprising: an electric power generating source; a battery; a first voltage converter configured to raise a voltage of the electric power generating source; a second voltage converter configured to raise a voltage of the battery; and an electric power converter configured to supply voltages, which are obtained by conversions by the respective first and second voltage converters, to a vehicle load.

2. Description of the Related Art

Japanese Patent Application Laid-open No. 2006-345606 and Japanese Patent Application Laid-open No. 2008-193864 have made known hybrid vehicles in which: a power control unit is placed in an engine compartment; and a battery unit is placed under rear seats or in a trunk. In addition, Japanese Patent Application Laid-open No. 2007-39020 has made known a hybrid vehicle in which a power control unit and a battery are placed in or under the back of rear seats. Meanwhile, in fuel cell vehicles and electric vehicles, a power control unit is placed in a motor compartment in most cases because no engine is mounted thereon, while a battery is often placed under a vehicle interior or in a trunk. In some cases, the power control unit is placed in a space under the vehicle interior instead of in the motor compartment, depending on the configuration of the power control unit.

In the meantime, for the viewpoint of enhancing merchantability, it is desirable to widen the vehicle interior and also the luggage containing space in the vehicle's rear portion. However, there is a limit to the widening of the vehicle interior and the luggage containing space in the vehicle's rear portion, in the case of the configuration in which the battery unit is placed under the rear seats or in the trunk as disclosed in the above-described Japanese Patent Application Laid-open Nos. 2006-345606 and 2008-193864, and the configuration in which the power control unit and the battery are placed in or under the back of the rear seats as disclosed in the above-described Japanese Patent Application Laid-open No. 2007-39020. Furthermore, in a case where a vehicle has a configuration in which the power control unit and the battery are placed in their respective separate locations, a space in which to arrange electric wires and cooling pipes connecting the power control unit and the battery needs to be secured under the floor. The space in which to arrange the electric wires and the cooling pipes is likely to hinder a wider space from being secured for the vehicle interior. In addition, the electric wires and the cooling pipes need protection covers for the protection from protrusions and the like on the road surface. This entails increase in the weight of the vehicle. Moreover, from the viewpoint of securing the electricity safety, further safety measurements are needed for the protection covers of the electric wires and the cooling pipes. In the case where the power control unit and the battery are placed in their separated locations, consideration needs to be given to safety measurements such as the containing of the power control unit and the battery in their respective separated rigid cases. This entails increase in the weight of the vehicle as well.

SUMMARY OF THE INVENTION

The present invention has been made with the above-described situation taken into consideration, and an object of the present invention is to provide a vehicle electric power supply system which makes it possible to widen a vehicle interior and a luggage containing space in the vehicle's rear portion, and to avoid increase in the weight of the vehicle.

In order to achieve the object, according to a first feature of the present invention, there is provided a vehicle electric power supply system comprising: an electric power generating source; a battery; a first voltage converter configured to raise a voltage of the electric power generating source; a second voltage converter configured to raise a voltage of the battery; and an electric power converter configured to supply voltages, which are obtained by conversions by the respective first and second voltage converters, to a vehicle load, wherein a power control unit, which includes the first voltage converter, the second voltage converter and the electric power converter, and the battery are integrated into a unitary component, and are placed in a front portion of a vehicle while isolated from a vehicle interior.

Such a configuration makes it possible: to reduce lengths of electric wires and cooling pipes connecting the power control unit and the battery together; to widen the vehicle interior and a luggage containing space in the vehicle's rear portion; to protect the electric wires and the cooling pipes easily; to avoid increase in the number of parts needed for the protection; and to reduce the space needed to the protection. In addition, because the reduction in the lengths of the electric wires leads to reduction in radiation noise which occurs while an electric power is being supplied, it is possible to simplify the shielding measurements. Furthermore, because neither the electric wires nor the cooling pipes exist under the floor, no attention needs to be paid to contact which would otherwise occur between the electric wires and the ground as well as between the cooling pipes and the ground, or a collision which would otherwise occur between the electric wires and protrusions or the like on the road surface as well as between the cooling pipes and protrusion or the like on the road surface.

According to a second feature of the present invention, in addition to the first feature, a fuel cell unit including a fuel cell as the electric power generating source is placed in a location which is close to lateral sides of the battery and the power control unit, and which is isolated from the vehicle interior.

Such a configuration enables not only the power control unit and the battery but also the fuel cell unit to be compactly arranged while placing the power control unit, the battery and the fuel cell unit closer to one another, and thereby makes it possible to inhibit operating noise of the fuel cell unit from entering the vehicle interior.

According to a third feature of the present invention, in addition to the first feature, the vehicle load is a motor, and a cooling system including a pump configured to circulate coolant for cooling the power control unit and a radiator configured to cool the coolant by releasing heat from the coolant is configured in a way that, starting at the radiator, the coolant sequentially passes the power control unit, the battery and the motor in this order.

Such a configuration is capable of cooling the motor and the battery in addition to the power control unit. Furthermore, the configuration makes enables the power control unit, the battery, the motor and the radiator to be integrated into a unitary cooling system. In addition, the configuration makes it possible to construct the cooling system in a compact size, and to reduce the lengths of wires, pipes and the like which constitute part of the cooling system.

According to a fourth feature of the present invention, in addition to the third feature, a heater is interposed between an outlet side of the pump configured to suck the coolant from the radiator, and the power control unit.

Such a configuration heats the coolant by use of the heater interposed between the outlet side of the pump and the power control unit, and is thus capable of raising the temperature of the battery when the temperature thereof is low.

According to a fifth feature of the present invention, in addition to the third feature, individual bypass circuits are respectively connected to the power control unit, the battery, the motor and the radiator.

Such a configuration can make the coolant ready to flow in the individual bypass circuits respectively connected to the power control unit, the battery, the motor and the radiator, and accordingly can cause the coolant to flow to each of the power control unit, the battery, the motor and the radiator only when deemed necessary.

According to a sixth feature of the present invention, in addition to the fifth feature, the cooling system includes control valve means, respectively, for the power control unit, the battery, the motor and the radiator, the control valve means being configured to control flow of the coolant to the bypass circuits in accordance with a temperature of the coolant which is flowing in each of the power control unit, the battery, the motor and the radiator.

Such a configuration is capable of performing the cooling optimally in accordance with the conditions of the power control unit, the battery, the motor and the radiator, by controlling the amount of coolant to be flowed in each of the bypass circuits individually corresponding to the power control unit, the battery, the motor and the radiator by use of the control valve means in accordance with the temperature of the coolant which is flowing in each of the power control unit, the battery, the motor and the radiator.

According to a seventh feature of the present invention, in addition to the sixth feature, a lowest temperature to be maintained is set individually for the power control unit, the battery and the motor, and a controller configured to control operation of the pump stops the operation of the pump when the temperatures of the coolant in all of the power control unit, the battery and the motor are at or below the corresponding lowest temperature.

In accordance with such a configuration, the operation of the pump is stopped when all of the temperatures of the coolant do not reach the lowest temperatures individually set for the power control unit, the battery and the motor. Thereby, the configuration makes it possible to avoid wasteful energy loss which would occur if the pump would be operated while no cooling is necessary.

The above description, other objects, characteristics and advantages of the present invention will be clear from detailed descriptions which will be provided for the preferred embodiment referring to the attached drawings.

DETAILED DESCRIPTION OF THE PREFERRED EMBODIMENT

Figure 1:
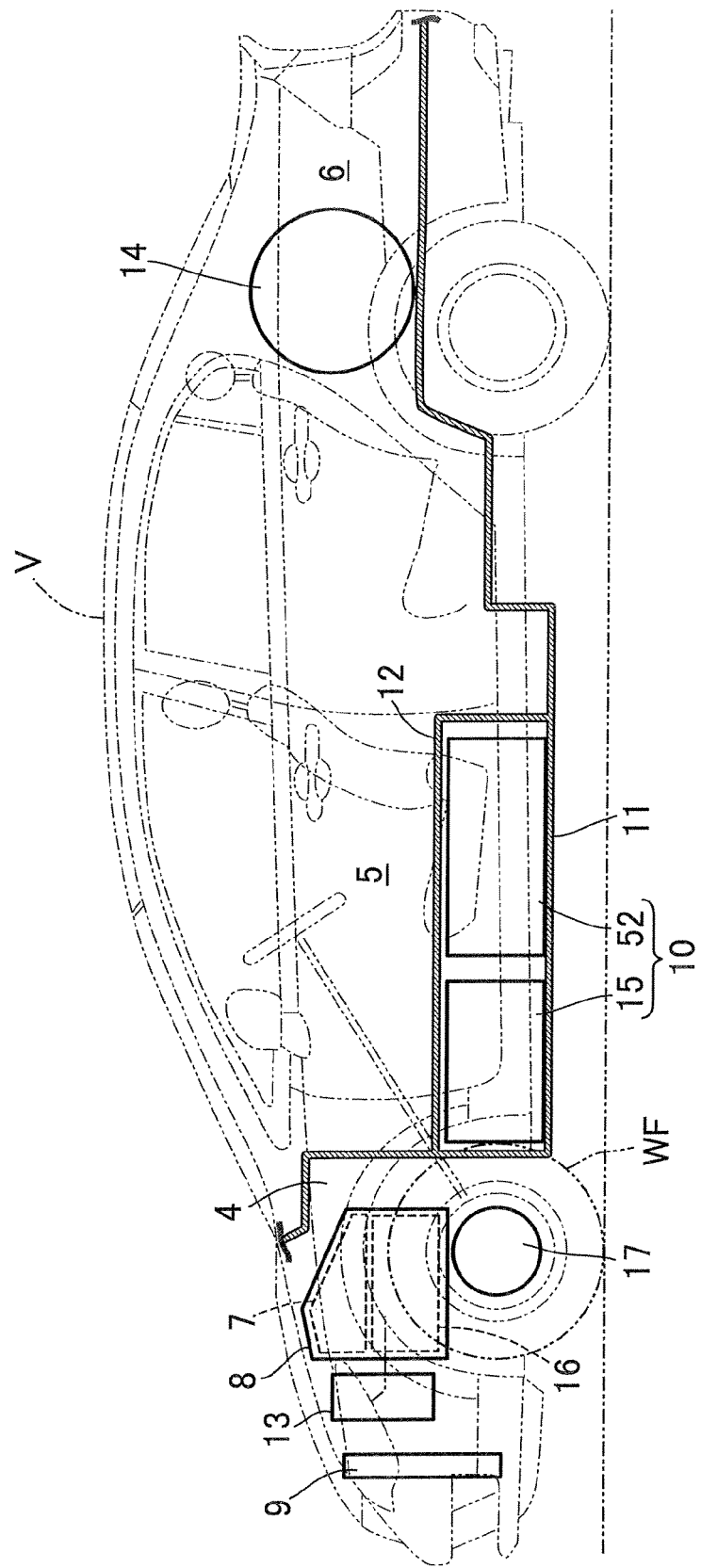
FIG. 1 is a side view showing a configuration of a vehicle electric power supply system while seeing through a vehicle.

Referring to FIGS. 1 to 6, descriptions will be hereinbelow provided for an embodiment of the present invention. First of all, referring to FIGS. 1 and 2, a unitary component including a battery 16 and a power control unit 7 placed above the battery 16 is placed in a motor compartment 4 in a front portion of a vehicle V as a fuel cell vehicle. The battery 16 and the power control unit 7 are contained in a common case 8. A radiator 9 is forward of the battery 16 and the power control unit 7. A motor 17 configured to produce a driving force for driving the driving wheels, for example, left and right front wheels WF is placed under the battery 16.

A fuel cell unit 10 including a fuel cell 15, which serves as an electric power generating source, is placed close to lateral sides of the battery 16 and the power control unit 7. In this embodiment, the fuel cell unit 10 supported on a supporting mount 11 extending in a front-rear direction is placed close to the battery 16 and the power control unit 7 from the rear side.

Further, the battery 16, the power control unit 7, the radiator 9 and the motor 17 are placed in the motor compartment 4 which is isolated from a vehicle interior 5 of the vehicle V. The supporting mount 11 and the fuel cell unit 10 are placed under the vehicle interior 5 with a partition wall 12 interposed in between and thereby isolated from the vehicle interior 5. The supporting mount 11 and the fuel cell unit 10 are placed, for example, between a driver's seat and a passenger seat in the vehicle interior 5.

An air supplying unit 13 connected to the fuel cell unit 10 is placed in the motor compartment 4 while interposed between the battery 16 and the power control unit 7, and the radiator 9. A high-pressure hydrogen tank 14 connected to the fuel cell unit 10 is placed in a trunk 6 in the back of the vehicle interior 5.

Figure 3:
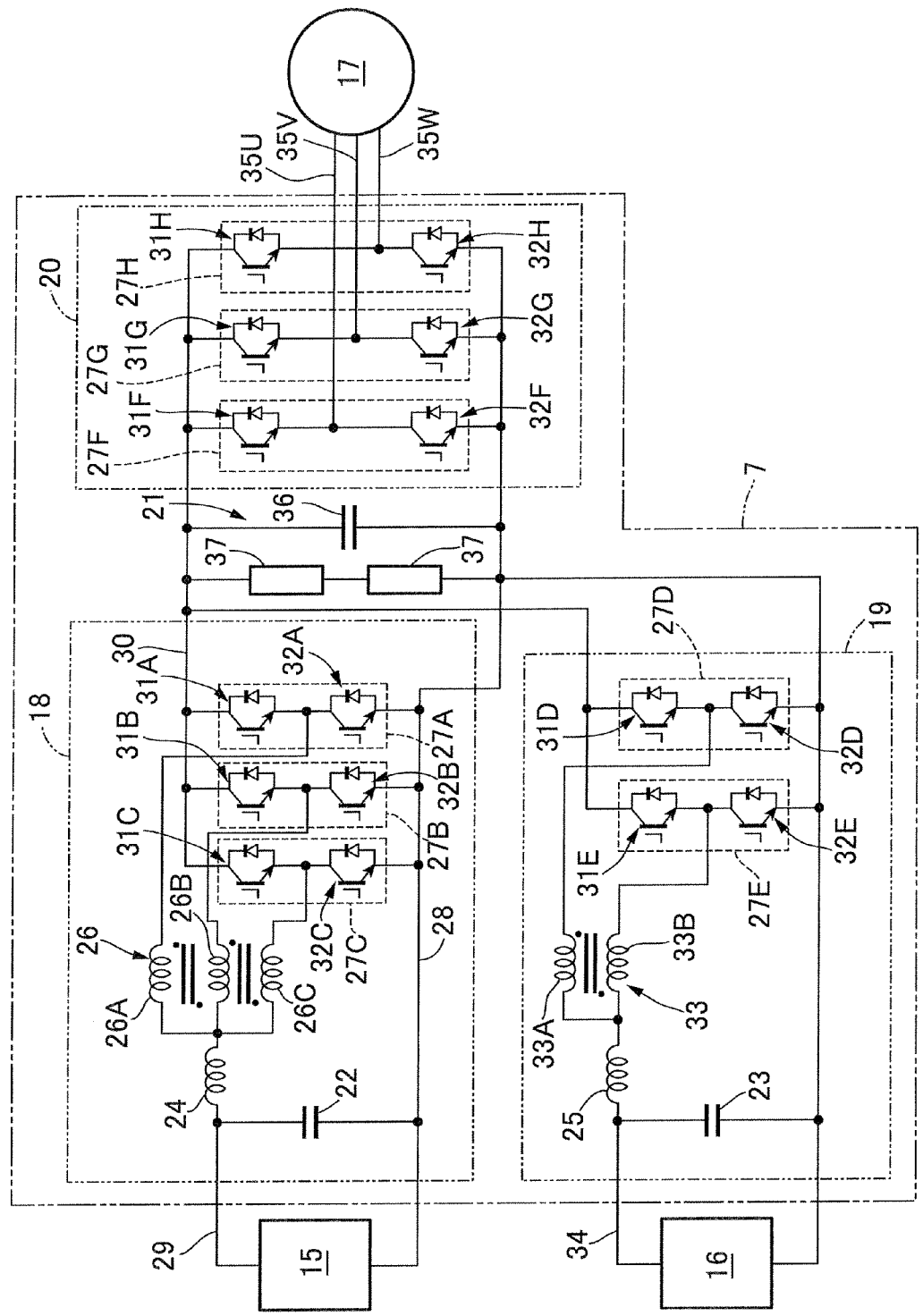
FIG. 3 is a circuit diagram showing a configuration of a power control unit.

Referring to FIG. 3, the power control unit 7 includes: a first voltage converter 18 configured to raise a voltage of the fuel cell 15; a second voltage converter 19 configured to raise a voltage of the battery 16; an electric power converter 20 configured to supply voltages, which are obtained by the conversions by the respective first and second voltage converters 18 and 19, to the motor 17; and a direct-current link capacitor unit 21 serving as a peripheral circuit of the voltage converters 18, 19 and the electric power converter 20.

The first voltage converter 18 includes: a first input capacitor 22; a first inductor 24; a three-phase transformer 26 including a primary winding 26A, a secondary winding 26B and a tertiary winding 26C; and first, second and third switching element modules 27A, 27B and 27C.

A ground line 28, which is common among the first voltage converter 18, the second voltage converter 19 and the electric power converter 20, is connected to the negative terminal of the fuel cell 15. The first input capacitor 22 is provided between the ground line 28 and a first input positive line 29, which is connected to the positive terminal of the fuel cell 15. An end of the first inductor 24 is connected to the first input positive line 29. In addition, ends of the respective primary, secondary and tertiary windings 26A, 26B and 26C of the three-phase transformer 26 are connected in parallel to the other end of the first inductor 24.

The first switching element module 27A includes: a first positive-side switching element 31A disposed between a common positive line 30 and the primary winding 26A of the three-phase transformer 26; and a first negative-side switching element 32A disposed between the primary winding 26A and the ground line 28. The common positive line 30 is common among the first voltage converter 18, the second voltage converter 19 and the electric power converter 20. The second switching element module 27B includes: a second positive-side switching element 31B disposed between the common positive line 30 and the secondary winding 26B of the three-phase transformer 26; and a second negative-side switching element 32B disposed between the secondary winding 26B and the ground line 28. The third switching element module 27C includes: a third positive-side switching element 31C disposed between the common positive line 30 and the tertiary winding 26C of the three-phase transformer 26; and a third negative-side switching element 32C disposed between the tertiary winding 26C and the ground line 28.

The second voltage converter 19 includes: a second input capacitor 23; a second inductor 25; a two-phase transformer 33 including a primary winding 33A and a secondary winding 33B; and fourth and fifth switching element modules 27D and 27E.

The second input capacitor 23 is provided between a second input positive line 34, which is connected to the positive terminal of the battery 16, and the ground line 28, which is connected to the negative terminal of the battery 16. An end of the second inductor 25 is connected to the second input positive line 34. In addition, ends of the respective primary and secondary windings 33A and 33B of the two-phase transformer 33 are connected in parallel to the other end of the second inductor 25.

The fourth switching element module 27D includes: a fourth positive-side switching element 31D disposed between the common positive line 30 and the primary winding 33A of the two-phase transformer 33; and a fourth negative-side switching element 32D disposed between the primary winding 33A and the ground line 28. The fifth switching element module 27E includes: a fifth positive-side switching element 31E disposed between the common positive line 30 and the secondary winding 33B of the two-phase transformer 33; and a fifth negative-side switching element 32E disposed between the secondary winding 33B and the ground line 28.

The electric power converter 20 includes sixth, seventh and eighth switching element modules 27F, 27G and 27H.

The sixth switching element module 27F includes: a sixth positive-side switching element 31F disposed between the common positive line 30 and a U-phase power line 35U communicating with the electric motor 17 which is a three-phase alternating current motor; and a sixth negative-side switching element 32F disposed between the U-phase power line 35U and the ground line 28. The seventh switching element module 27G includes: a seventh positive-side switching element 31G disposed between the common positive line 30 and a V-phase power line 35V communicating with the electric motor 17; and a seventh negative-side switching element 32G disposed between the V-phase power line 35V and the ground line 28. The eighth switching element module 27H includes: an eighth positive-side switching element 31H disposed between the common positive line 30 and a W-phase power line 35W communicating with the electric motor 17; and an eighth negative-side switching element 32H disposed between the W-phase power line 35W and the ground line 28.

In this embodiment, each of the first to eighth positive-side switching elements 31A to 31H and the first to eighth negative-side switching elements 32A to 32H of the first to eighth switching element modules 27A to 27H is made of an insulated gate bipolar transistor (IGBT) and a diode which is connected in parallel to the IGBT with the forward direction defined as a direction from the emitter to the collector.

The direct-current link capacitor unit 21 includes smoothing capacitors 36 which are provided between the common positive line 30 and the ground line 28. Incidentally, FIG. 3 shows only one smoothing capacitor 36 for the sake of simplicity. However, the direct-current link capacitor unit 21 includes the smoothing capacitors 36 which are provided between the common positive line 30 and the ground line 28 while respectively corresponding to the U, V and W phases of the electric motor 17 which is a three-phase alternating-current motor.

In addition, a series-connection circuit including paired discharging resistors 37 and 37 is connected between the common positive line 30 and the ground line 28.

Figure 4:
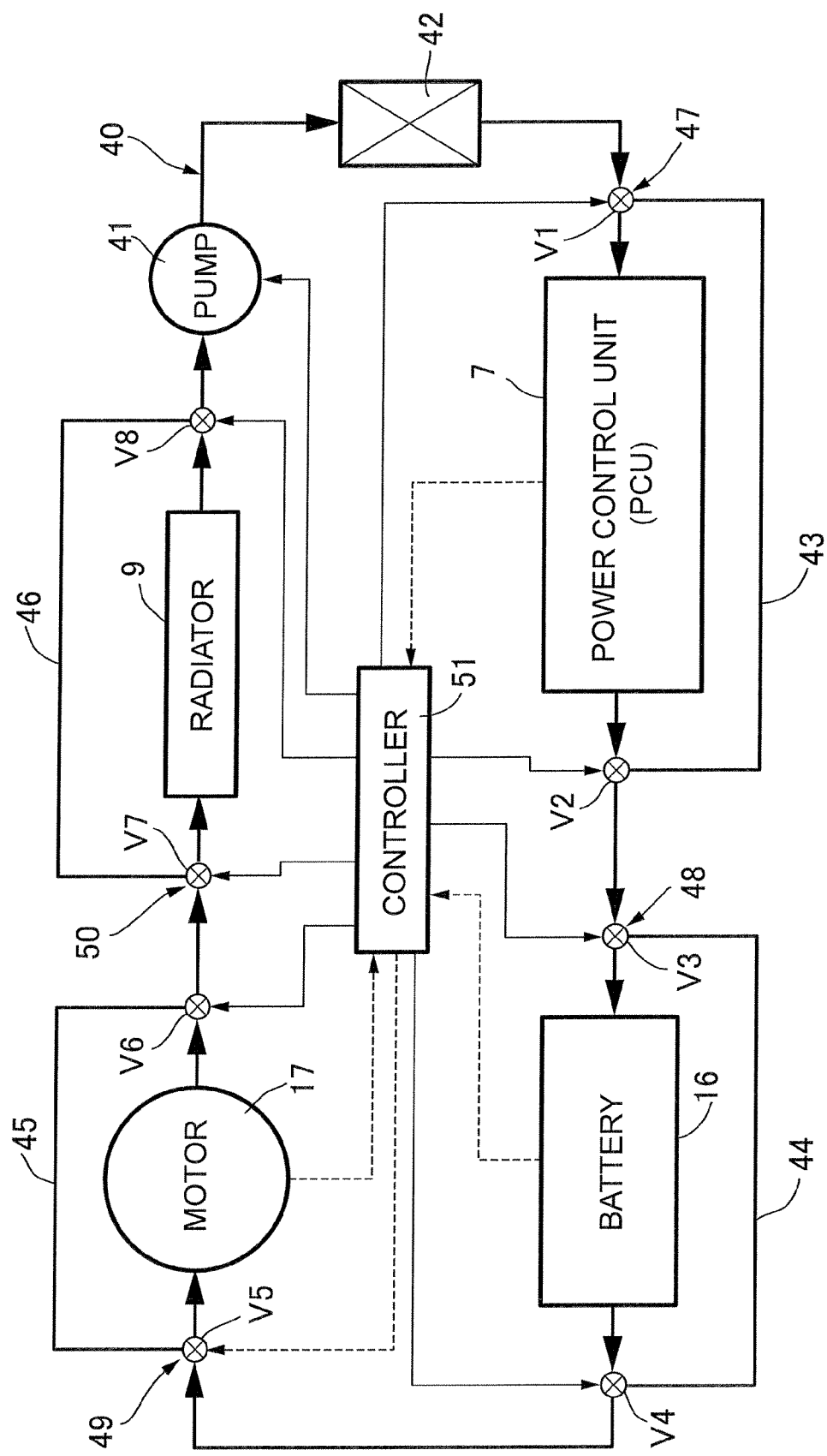
FIG. 4 is a view showing a configuration of a cooling system.

Referring to FIG. 4, the power control unit 7 is cooled by a cooling system 40 configured to circulate coolant such for example as cooling water. This cooling system 40 includes: a pump 41 configured to circulate the cooling water; and the radiator 9 configured to cool the cooling water by releasing the heat from the cooling water. The cooling system 40 is configured in a way that, starting at the radiator 9, the cooling water sequentially passes the power control unit 7, the battery 16 and the motor 17 in this order. An inlet side of the pump 41 is connected to an outlet of the radiator 9. A heater 42 is interposed between an outlet side of the pump 41 and the power control unit 7.

Further, individual bypass circuits 43, 44, 45 and 46 are connected to the power control unit 7, the battery 16, the motor 17 and the radiator 9, respectively. Furthermore, the flow of the cooling water to the power control unit 7, the battery 16, the motor 17 and the radiator 9 as well as the flow of the cooling water to the bypass circuits 43 to 46 are switched and controlled by the operation of control valve means 47, 48, 49 and 50 which are configured to be controlled by a controller 51 in accordance with the temperature of the coolant which is flowing in each of the power control unit 7, the battery 16, the motor 17 and the radiator 9.

The control valve means 47 corresponding to the power control unit 7 includes three-way solenoid selector valves V1 and V2 respectively provided to the inlet and outlet of the bypass circuit 43. The control valve means 48 corresponding to the battery 16 includes three-way solenoid selector valves V3 and V4 respectively provided to the inlet and outlet of the bypass circuit 44. The control valve means 49 corresponding to the motor 17 includes three-way solenoid selector valves V5 and V6 respectively provided to the inlet and outlet of the bypass circuit 45. The control valve means 50 corresponding to the radiator 9 includes three-way solenoid selector valves V7 and V8 respectively provided to the inlet and outlet of the bypass circuit 46.

It should be noted that the control valve means 47 to 50 may be thermostats configured to operate automatically without the control by the controller 51.

In the meantime, a temperature range within which the temperature should be maintained is set for each of the power control unit 7, the battery 16, the motor 17 and the radiator 9. A temperature range (TA<T<TB) in which the temperature T is higher than a temperature TA (for example, 40° C.) and lower than a temperature TB (for example, 100° C.) is set for the power control unit 7. A temperature range (TC<T<TD) in which the temperature T is higher than a temperature TC (for example, 0° C.) and lower than a temperature TD (for example, 60° C.) is set for the battery 16. A temperature range (TE<T<TF) in which the temperature T is higher than a temperature TE (for example, 0° C.) and lower than a temperature TF (for example, 100° C.) is set for the motor 17. For the radiator 9, the temperature T of the cooling water to be introduced thereto is set at a temperature TG (for example, 70° C.). The control valve means 47 to 50 are controlled in order that the temperatures of the power control unit 7, the battery 16, the motor 17 and the radiator 9 can be maintained within the respective temperature ranges set therefor.

Figure 5:
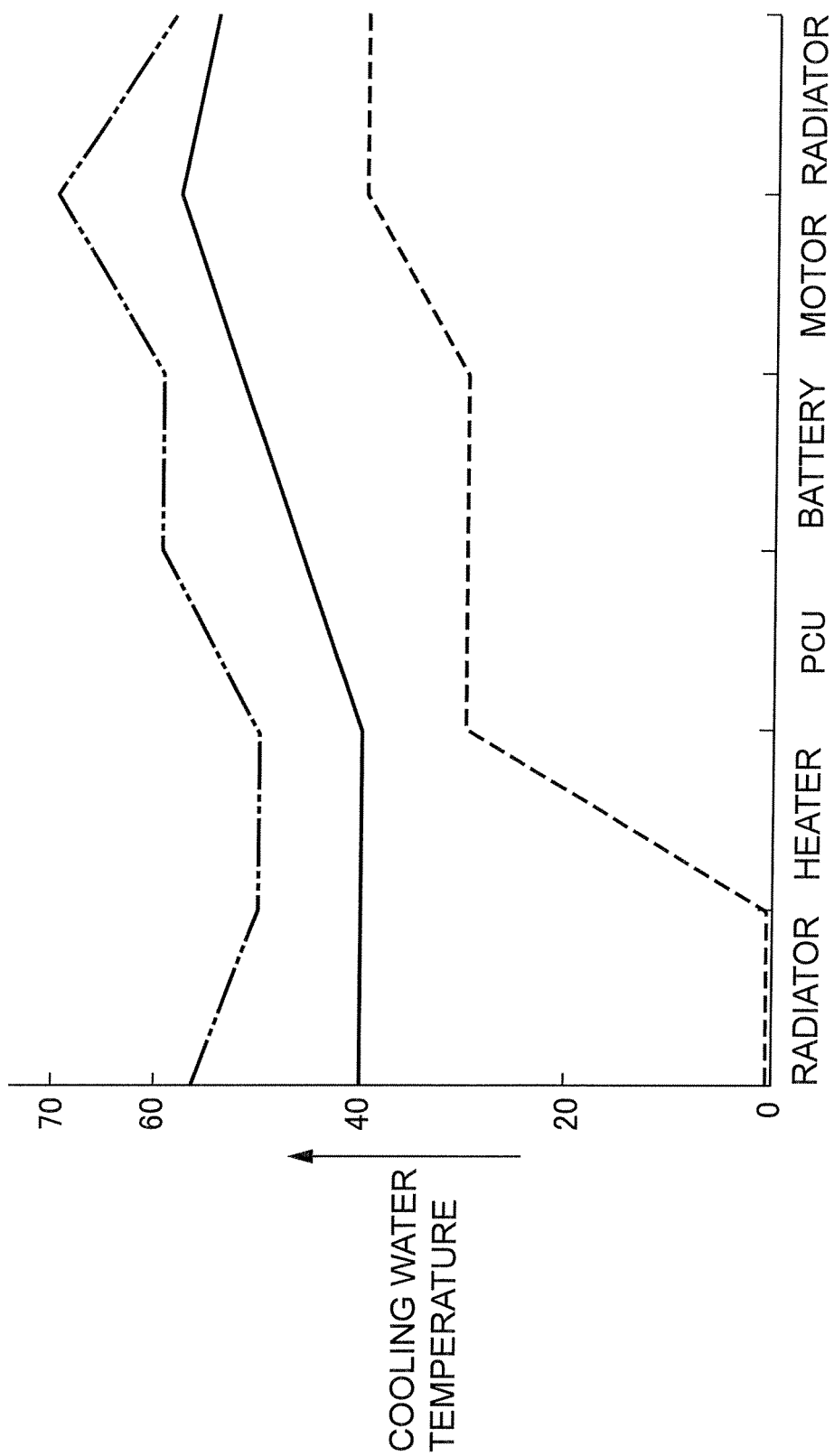
FIG. 5 is a view showing an example of a temperature change of cooling water in the cooling system.

By the setting of such temperature range, the temperature of the cooling water in the cooling system 40 changes as shown in, for example, FIG. 5. During the starting operation in a cool state, the temperature of the cooling water changes as shown by the chain line in FIG. 5. During the normal running operation, the temperature of the cooling water changes as shown by the continuous line in FIG. 5. When the temperature of the cooling water is higher, the temperature thereof changes as shown by the dash-dotted line in FIG. 5.

The operation of the pump 41 is controlled by the controller 51 as well. The lowest temperatures to be respectively maintained in the power control unit 7, the battery 16 and the motor 17, namely, the temperatures TB, TD, TF are individually set in this controller 51. The controller 51 is configured to stop the operation of the pump 41 when the temperatures of the cooling water in all of the power control unit 7, the battery 16 and the motor 17 are at or below the corresponding lowest temperature.

Figure 6:
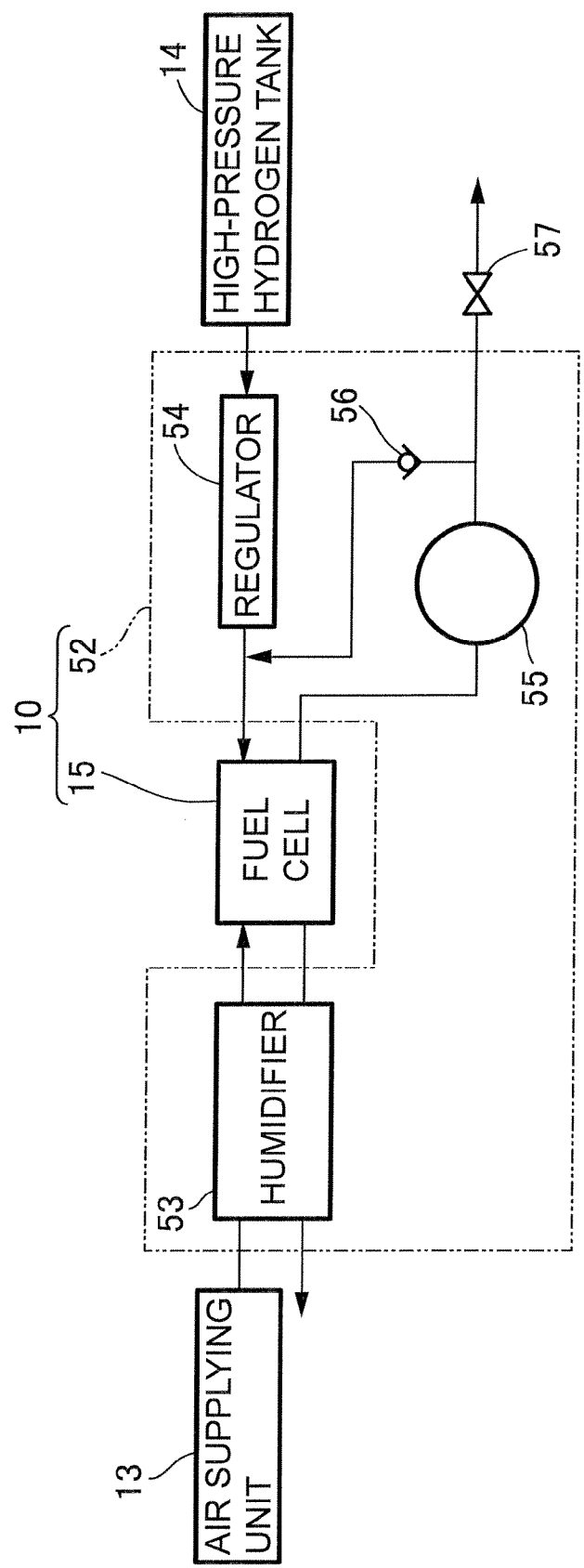
FIG. 6 is a block diagram showing an outline of a configuration of a fuel cell system.

Referring to FIG. 6, the fuel cell 15 is supplied with the pressurized air from the air supplying unit 13 through a humidifier 53, and with the high-pressure hydrogen from the high-pressure hydrogen tank 14 through a regulator 54. The hydrogen sucked from the fuel cell 15 by a circulation pump 55 is returned to the downstream side of the regulator 54 through a check valve 56. In addition, an on-off valve 57 is connected between the circulation pump 55 and the check valve 56.

Figure 2:
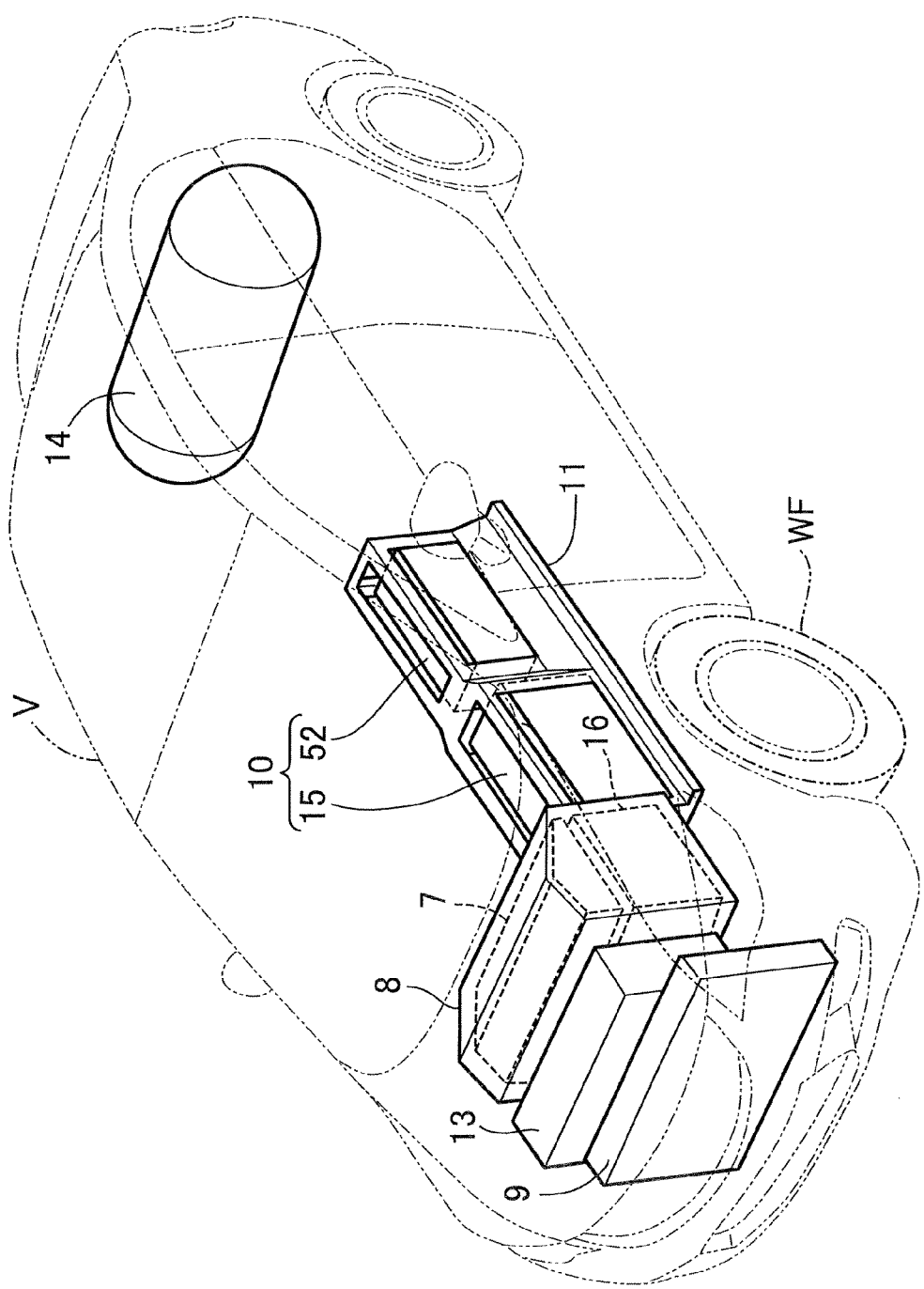
FIG. 2 is a perspective view showing a configuration of the vehicle electric power supply system while seeing through the vehicle.

In this fuel cell system thus configured, the humidifier 53, the regulator 54, the circulation pump 55 and the check valve 56 are integrated into a unitary component as an accessory 52. The accessory 52 and the fuel cell 15 constitute the fuel cell unit 10. The accessory 52 is placed in the back of the fuel cell 15, and is supported on the supporting mount 11, as shown in FIGS. 1 and 2.

Next, descriptions will be provided for operations of this embodiment. The power control unit 7, which includes the first voltage converter 18, the second voltage converter 19 and the electric power converter 20, and the battery 16 are integrated into the unitary component. The power control unit 7 and the battery 16 are placed in the front portion of the vehicle while isolated from the vehicle interior 5. For this reason, it is possible to reduce the lengths of the electric wires and the cooling pipes connecting the power control unit 7 and the battery 16 together; to widen the vehicle interior 5 and the luggage containing space in the rear portion of the vehicle; to protect the electric wires and the cooling pipes easily; to avoid the increase in the number of parts needed for the protection; and to reduce the space needed for the protection. Furthermore, because the reduction in the lengths of the electric wires leads to reduction in radiation noise which occurs while an electric power is being supplied, it is possible to simplify the shielding measurements. Moreover, because neither the electric wires nor the cooling pipes exist under the floor, no attention needs to be paid to contact which would otherwise occur between the electric wires and the ground as well as between the cooling pipes and the ground, or a collision which would otherwise occur between the electric wires and protrusions or the like on the road surface as well as between the cooling pipes and protrusion or the like on the road surface.

The fuel cell unit 10 including the fuel cell 15 is placed in the location which is close to the lateral sides of the battery 16 and the power control unit 7 (in the back of the battery 16 and the power control unit 7 in this embodiment), and which is isolated from the vehicle interior 5. For this reason, not only the power control unit 7 and the battery 16 but also the fuel cell unit 10 can be compactly arranged while placing the power control unit 7, the battery 16 and the fuel cell unit 10 closer to one another, thereby making it possible to inhibit operating noise of the fuel cell unit 10 from entering the vehicle interior 5.

Moreover, the cooling system 40 configured to cool the power control unit 7 by circulating the cooling water includes: the pump 41 configured to circulate the cooling water; and the radiator 9 configured to cool the cooling water by releasing the heat from the cooling water. The cooling system 40 is configured in a way that, starting at the radiator 9, the coolant sequentially passes the power control unit 7, the battery 16 and the motor 17 in this order. For these reasons, the motor 17 and the battery 16 can be cooled in addition to the power control unit 7. Thus, it is possible to integrate the power control unit 7, the battery 16, the motor 17 and the radiator 9 into the unitary cooling system 40. In addition, it is possible to construct the cooling system 40 in a compact size, and accordingly to reduce the lengths of wires, pipes and the like which constitute part of the cooling system 40.

Additionally, the heater 42 is interposed between the power control unit 7 and the outlet side of the pump 41 configured to suck the cooling water from the radiator 9. For this reason, it is possible to heat the cooling water by use of the heater 42, and accordingly to raise the temperature of the battery 16 when the temperature thereof is low.

Besides, the individual bypass circuits 43, 44, 45 and 46 are connected to the power control unit 7, the battery 16, the motor 17 and the radiator 9, respectively. For this reason, it is possible to make the cooling water ready to flow to the bypass circuits 43 to 46, and accordingly to cause the coolant to flow to each of the power control unit 7, the battery 16, the motor 17 and the radiator 9 only when deemed necessary.

In addition, the cooling system 40 includes the control valve means 47, 48, 49 and 50, respectively, for the power control unit 7, the battery 16, the motor 17 and the radiator 9. The control valve means 47, 48, 49 and 50 are configured to control of the flow of the cooling water to the bypass circuits 43, 44, 45 and 46 in accordance with the temperature of the coolant which is flowing in each of the power control unit 7, the battery 16, the motor 17 and the radiator 9. For this reason, it is possible to perform the cooling optimally in accordance with the conditions of the power control unit 7, the battery 16, the motor 17 and the radiator 9, by controlling the amount of coolant to be flowed in each of the bypass circuits 43 to 46 individually corresponding to the power control unit 7, the battery 16, the motor 17 and the radiator 9 by use of the control valve means 47 to 50 in accordance with the temperature of the cooling water which is flowing in each of the power control unit 7, the battery 16, the motor 17 and the radiator 9.

Furthermore, the lowest temperature to be maintained is set for each of the power control unit 7, the battery 16 and the motor 17. The controller 51 configured to control the operation of the pump 41 stops the operation of the pump 41 when the temperatures of the cooling water in all of the power control unit 7, the battery 16 and the motor 17 are at or below the corresponding lowest temperature. For these reasons, it is possible to avoid wasteful energy loss which would occur if the pump 41 would be operated while no cooling is necessary.

An embodiment of the present invention is explained above, but the present invention is not limited to the above-mentioned embodiment and may be modified in a variety of ways as long as the modifications do not depart from the gist of the present invention.

The foregoing descriptions have been provided for the embodiment in which, for example, the fuel cell 15 is used as the electric power generating source. Nevertheless, the present invention can be applied to a hybrid vehicle in which an electric power generator configured to be driven by an engine is used as the electric power generating source.

What is claimed is:

1. A vehicle electric power supply system comprising:
an electric power generating source;
a battery;
a first voltage converter configured to raise a voltage of the electric power generating source;
a second voltage converter configured to raise a voltage of the battery; and
an electric power converter configured to supply voltages, which are obtained by conversions by the respective first and second voltage converters, to a vehicle load, wherein
a power control unit, which includes the first voltage converter, the second voltage converter and the electric power converter, and the battery are integrated into a unitary component, and are placed in a front portion of a vehicle while isolated from a vehicle interior, wherein
a fuel cell unit including a fuel cell as the electric power generating source is placed in a location which is close to lateral sides of the battery and the power control unit, and which is isolated from the vehicle interior, and wherein
the vehicle load is a motor, and
a cooling system including a pump configured to circulate coolant for cooling the power control unit and a radiator configured to cool the coolant by releasing heat from the coolant is configured in a way that, starting at the radiator, the coolant sequentially passes the power control unit, the battery and the motor in this order.

2. The vehicle electric power supply system according to claim 1, wherein
a heater is interposed between an outlet side of the pump configured to suck the coolant from the radiator, and the power control unit.

3. The vehicle electric power supply system according to claim 1, wherein
the fuel cell unit is located close to end faces of the battery and the power control unit which are positioned rearwardly of the vehicle.

4. The vehicle electric power supply system according to claim 3, wherein
an upper end of the fuel cell is positioned lower than an upper end of the power control unit.

5. A vehicle electric power supply system comprising:
an electric power generating source;
a battery;
a first voltage converter configured to raise a voltage of the electric power generating source;
a second voltage converter configured to raise a voltage of the battery; and
an electric power converter configured to supply voltages, which are obtained by conversions by the respective first and second voltage converters, to a vehicle load, wherein
a power control unit, which includes the first voltage converter, the second voltage converter and the electric power converter, and the battery are integrated into a unitary component, and are placed in a front portion of a vehicle while isolated from a vehicle interior, wherein
the vehicle load is a motor, and
a cooling system including a pump configured to circulate coolant for cooling the power control unit and a radiator configured to cool the coolant by releasing heat from the coolant is configured in a way that, starting at the radiator, the coolant sequentially passes the power control unit, the battery and the motor in this order, and wherein
individual bypass circuits are respectively connected to the power control unit, the battery, the motor and the radiator.

6. The vehicle electric power supply system according to claim 5, wherein
the cooling system includes control valve means, respectively, for the power control unit, the battery, the motor and the radiator, the control valve means being configured to control flow of the coolant to the bypass circuits in accordance with a temperature of the coolant which is flowing in each of the power control unit, the battery, the motor and the radiator.

7. The vehicle electric power supply system according to claim 6, wherein
a lowest temperature to be maintained is set individually for the power control unit, the battery and the motor, and
a controller configured to control operation of the pump stops the operation of the pump when the temperatures of the coolant in all of the power control unit, the battery and the motor are at or below the corresponding lowest temperature.

* * * * *